United States Patent Office 3,549,645
Patented Dec. 22, 1970

3,549,645
SULFONYL-UREA AND SULFONYL-SEMI-
CARBAZIDE ANTIDIABETIC AGENTS
Ruth Heerdt, Mannheim-Feudenheim, Felix Helmut
Schmidt, Mannheim-Neuostheim, Kurt Stach, Mannheim-Waldhof, and Helmut Weber, Frankfurt am Main-Schwanheim, Germany, assignors to Boehringer Mannheim Gesellschaft mit beschrankter Haftung, a corporation of Germany
No Drawing. Filed May 29, 1967, Ser. No. 642,137
Claims priority, application Germany, July 2, 1966,
B 87,824
Int. Cl. C07c 127/00
U.S. Cl. 260—293.4                                  8 Claims

ABSTRACT OF THE DISCLOSURE

A novel class of blood sugar reducing agents are disclosed having the structural formula:

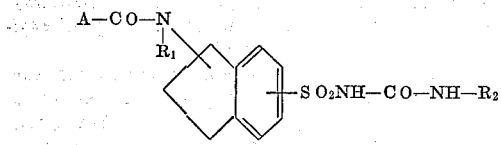

wherein A is alkyl, alkenyl, aryl, aralkyl, aryloxyalkyl, arylthioalkyl, cycloalkyl, cycloalkenyl, thienyl, furyl, alkoxy, alkenyloxy, aralkoxy, cycloalkoxy, cycloalkylalkoxy, cycloalkenyloxy, cycloalkenylalkoxy or the radical

wherein V and W are each hydrogen, alkyl, cycloalkyl, aryl or aralkyl or V and W can be linked together to form, with the nitrogen atom to which they are attached, a heterocyclic structure and wherein A may be substituted with one or more halogen atoms, lower alkoxy- or lower alkyl-groups, $R_1$ is hydrogen, lower alkyl or aralkyl, and $R_2$ is alkyl, alkenyl or cycloalkyl, cycloalkenyl alkylcycloalkyl which can contain oxygen or sulfur atoms in their chains or rings respectively, aryl, aralkyl, alkylene-imino, alkyl-alkylene-imino containing from 3 to 7 carbon atoms which can also contain endo-alkylene groups having up to 3 carbon atoms. Therapeutic compositions containing said compounds and methods for using the same in the treatment of diabetes, are also disclosed.

This invention relates to new sulfonyl-ureas and sulfonyl-semicarbazides and more particularly relates to new sulfonyl-ureas and sulfonyl-semicarbazides having blood sugar reducing properties, the therapeutic compositions containing the same and the method for using them.

In accordance with the invention, it has now been found that hydrindene-sulfonyl-ureas and semi-carbazides having an acylamino or carbamido radical are characterized by an especially marked and along-lasting antidiabetic activity.

The new blood sugar lowering sulfonyl-ureas and sulfonyl-semicarbazides of the invention are represented by the following formula:

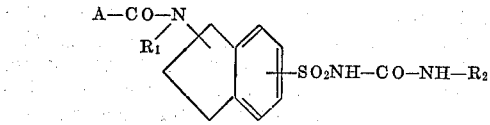

wherein A is unsubstituted or substituted alkyl, alkenyl, aryl aralkyl, aryloxyalkyl, arylthioalkyl, cycloalkyl, cyclo- alkenyl, thienyl, furyl, alkoxy, alkenyloxy, aralkoxy, cycloalkoxy, cycloalkylalkoxy, cycloalkenyloxy, cycloalkenylalkoxy or the radical:

wherein V and W, which may be the same or different, are each hydrogen, unsubstituted or substituted alkyl, cycloalkyl, aryl or aralkyl or, V and W linked together with the nitrogen atom to which they are attached, form an unsubstituted or substituted, saturated heterocyclic radical, $R_1$ is hydrogen, lower alkyl or aralkyl, and $R_2$ is straight chain or branched, saturated or unsaturated alkyl, or cycloalkyl, which can contain oxygen or sulfur atoms in their chains or rings respectively, unsubstituted or substituted aryl or aralkyl or an unsubstituted or substituted alkylene-imino radical containing 3 to 7 carbon atoms which can also contain an endo-alkylene group having up to 3 carbon atoms.

The new compounds according to the present invention can be prepared by conventional methods. Thus, for example, the following methods can be used:

(a) Reaction of a hydrindene-sulfonyl compound of the formula:

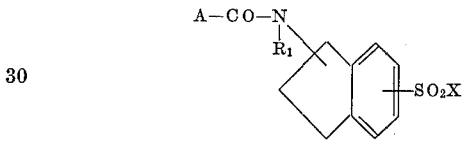

with a compound of the formula Y—$R_2$, wherein A, $R_1$ and $R_2$ have the same significance as set out above, and one of the two substituents X and Y is an amino group and the other is an isocyanate group or a group readily converted into an isocyanate group under the reaction conditions.

Thus, for example, a sulfonamide, preferably in the form of its sodium or potassium salt, is reacted with an isocyanate of the formula $R_2$·NCO or, alternatively, a sulfonyl isocyanate is reacted with an amine of the formula $R_2$·$NH_2$ or with an acyl derivative thereof. Instead of the isocyanates, there can also be employed compounds which, under the reaction conditions are able to undergo conversion into an isocyanic acid ester. The so-called "isocyanate formers" of this type include, for example, suitable carbamic acid halides, urethanes or thiourethanes, ureas, as well as their acyl derivatives, disulfonylureas and the corresponding hydrazine derivatives.

(b) Hydrolysis of an hydrindene-sulfonyl-thiourea or -thiosemicarbazide of the formula

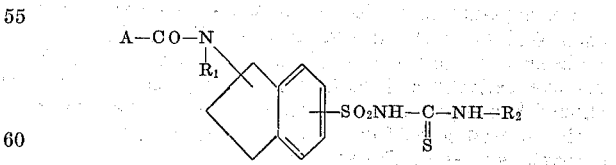

wherein A, $R_1$ and $R_2$ have the same significance as set out above, or hydrolysis of an hydrindene-sulfonylguanidine or -amino-guanidine of the formula

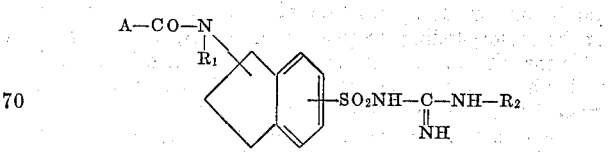

wherein A, R₁ and R₂ have the same significance as set out above, or hydrolysis of an hydrindene-sulfonyl-isourea ether or isosemicarbazide ether of the formula:

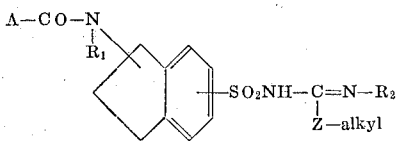

wherein A, R₁ and R₂ have the same significance as set out above and Z is an oxygen or sulfur atom.

The conversion of the sulfonyl-guanidines or amino-guanidines is preferably carried out by alkaline hydrolysis, as for example, with an alkali metal hydroxide, that of the isourea ethers or isosemicarbazide ethers by acidic hydrolysis, for example, with a hydrogen halide, and that of the thioureas or thiosemicarbazides or of their thio-ethers by oxidative hydrolysis, as for example, with nitrous acid or a heavy metal oxide, such as mercury oxide.

(c) Reaction of a hydrindene-sulfonyl halide of the formula:

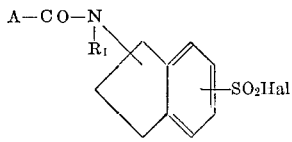

wherein A and R₁ have the same significance as set out above and Hal is a halogen atom, with an urea or semicarbazide of the formula:

$$H_2N—CO—NH—R_2$$

wherein R₂ has the same significance as given above.

In the case of this latter method, instead of the urea or semicarbazide, it is more advantageous to use the corresponding parabanic acid derivative having the formula:

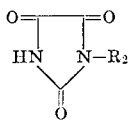

wherein R₂ has the same meaning as given above, followed by hydrolysis of the intermediate obtained.

(d) Acylation of an amino-hydrindene derivative of the formula:

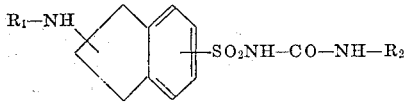

wherein R₁ and R₂ have the same significance as set out above, with a reactive derivative of an acid of the formula A·COOH, in which A is as defined above.

The acylation is carried out in known manner, as for example, by reaction with the corresponding acid halides, preferably in the presence of an acid acceptor, or with reactive derivatives thereof. When A represents a substituted hydroxyl group, it is advantageous to start from a chlorocarbonic acid ester or the corresponding ortho-carbonic acid ester. The radical

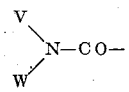

can be introduced by reaction with carbamic acid halides or the corresponding isocyanates. However, it is also possible that the aminohydrindene derivatives first be treated with phosgene and the intermediates thus obtained then reacted with the appropriate alcohol or amine.

The invention will be more fully understood from the following examples which are given by way of illustration and without any intention that the invention be limited thereto.

EXAMPLE 1

N-[2 - (m-chlorobenzamido)-hydrindene-5-sulfonyl]-N'-cyclohexyl-urea 3.6 g. 2 - (m-chlorobenzamido)-hydrindene-5-sulfonamide (M.P. 178–180° C.) were boiled for half an hour with 4.4 g. anhydrous potassium carbonate in 40 ml. anhydrous acetone. Following the addition of 1.4 g. cyclohexyl isocyanate, the reaction mixture was boiled under reflux for 8 hours. It was then allowed to cool, filtered with suction and the residue taken up in water. The aqueous extract was then treated with animal charcoal, filtered and the filtrate mixed with dilute hydrochloric acid. In this manner, there was obtained, in a yield of 73%, N-[2-(m-chlorobenzamido)-hydrindene - 5 - sulfonyl]-N'-cyclohexyl-urea having a melting point of 195–196° C.

The following compounds were prepared in an analogous manner:

From 2 - (2,5 - dimethoxy-benzamido)-hydrindene-5-sulfonamide (M.P. 218° C.), N-[2 - (2,5 - dimethoxy-benzamido)-hydrindene - 5 - sulfonyl]-N'-cyclohexyl-urea; yield 80%; M.P. 118–120° C.;

From 2 - (2-methoxy-5-bromobenzamido)-hydrindene-5 - sulfonamide (M.P. 224–227° C.), N-[2-(2-methoxy-5-bromobenzamido)-hydrindene - 5 - sulfonyl]-N'-butyl-urea; M.P. 97° C. (decomp.), after recrystallization from dimethyl formamide/alcohol/water; yield 65%;

From 2 - (2-methoxy-5-methyl-benzamido)-hydrindene-5-sulfonamide (M.P. 191–192° C.), N-[2-(2-methoxy-5-methyl-benzamido)-hydrindene - 5 - sulfonyl] - N' - (4-methyl-cyclohexyl)-urea; M.P. 126–128° C.;

From 2 - (N-phenyl-N-methyl-ureido)-hydrindene-5-sulfonamide (M.P. 185–186° C.), N-[2 - (N-phenyl-N-methyl-ureido)-hydrindene - 5 - sulfonyl]-N'-(4-methyl-cyclohexyl)-urea; M.P. 110° C. (decomp.); yield 60%;

From 2 - (phenyl-thioacetamido)-hydrindene-5-sulfonamide (M.P. 132–134° C.), N-[2-(phenylthiocetamido)-hydrindene - 5 - sulfonyl]-N'-cyclohexyl-urea; M.P. 144–146° C.; yield 70%;

From 2 - (phenyl-propionylamino)-hydrindene-5-sulfonamide (M.P. 209–212° C.), N-[2-(phenyl-propionyl-amino)-hydrindene - 5 - sulfonyl]-N'-(4 - methyl-cyclohexyl)-urea; M.P. 128–130° (decomp.); yield 65%;

From 2 - (hexahydro-benzamido)-hydrindene-5-sulfonamide (M.P. 176 – 178° C.), N-[2 - (hexahydro - benz-amido)-hydrindene - 5 - sulfonyl] - N' - (4-methyl-cyclohexyl)-urea; M.P. 193–195° C.; yield 80%; and From 2-(2 - methoxy-5-bromobenzamido)-hydrindene-5-sulfonamide, N-[2 - (2-methoxy-5-bromobenzamido)-hydrindene-5-sulfonyl]-N' - (Δ³-cyclohexenyl)-urea; M.P. 191–192° C., after recrystallization from isopropanol/water; yield 53%.

EXAMPLE 2

N-[2-(2-methoxy - 5 - chlorobenzamido)-hydrindene-5-sulfonyl]-N'-cyclohexyl-urea 3 g. N-(2-amino-hydrindene-5-sulfonyl)-N'-cyclohexyl-urea [M.P. 185–186° C.; prepared by saponification of the corresponding acetamido compound (M.P. 126–128° C.)] were dissolved in 15 ml. anhydrous pyridine and mixed with 1.8 g. 5-chloro-2-methoxy-benzoyl chloride, under ice cooling. For completion of the reaction, the reaction mixture was allowed to stand overnight at room temperature and then heated for 1 hour on a steam bath. The cooled reaction mixture was then poured on to ice and the precipitated material taken up in a dilute solution of sodium carbonate. After treatment with animal charcoal, the filtered solution was mixed with dilute hydrochloric acid. In this manner, there was obtained, in a yield of 53%, N-[2-(2-methoxy - 5 - chlorobenzamido)-hydrindene-5-sulfonyl]-N'-cyclohexyl-urea having a melting point of 124–126° C.

EXAMPLE 3

4 - [2-(2-methoxy - 5 - chlorobenzamido)-hydrindene-5-sulfonyl] - 1,1 - (3,3 - dimethyl-pentamethylene)-semicarbazide Method I.—3.5 g. N-[2-(2-methoxy - 5 - chlorobenzamido)-hydrindene-5-sulfonyl]-ethyl-urethane (M.P. 176–178° C.) were dissolved in 20 cc. toluene, mixed with 1 g. N-amino-4,4-dimethylpiperidine and heated for 3 hours at 120° C. After cooling, the reaction mixture was filtered with suction and the residue taken up with dilute sodium carbonate solution. The alkaline solution was then filtered through charcoal and treated with dilute hydrochloric acid. For purification, the precipitated product was treated with alcohol. There was thusly obtained 4-[2-(2-methoxy-5-chlorobenzamido)-hydrindene - 5 - sulfonyl]-1,1-(3,3-dimethyl-pentamethylene)-semicarbazide having a melting point of 195–197° C.

The following compounds were obtained in an analogous manner:

From N-[2-(2-methoxy-5-methyl-benzamido)-hydrindene-5-sulfonyl]ethyl-urethane (M.P. 178–179° C.), N-[2-(2-methoxy-5-methylbenzamido) - hydrindene - 5 - sulfonyl]-N'-(4-methoxy-cyclohexyl)-urea; M.P. 120° C. (decomp.), purified by dissolving in dilute sodium carbonate solution and precipitation with dilute hydrochloric acid; yield 50%, and 4-[2-(2-methoxy-5-methyl-benzamdio)-hydrindene - 5 - sulfonyl] - 1,1 - (3,3-dimethyl-pentamethylene)-semicarbazide; M.P. 128–130° C. (decomp.), purified by recrystallization of the corresponding sodium salt from water; yield 53%;

From N-[2-(2-methoxy-5-chlorobenzamido) - hydrindene-5-sulfonyl]-ethyl-urethane; N-[2-(2-methoxy-5-chlorobenzamido) - hydrindene - 5 - sulfonyl]-N'-(4-methylcyclohexyl)-urea; M.P. 187–188° C., after recrystallization from methanol; yield 58%, and N-[2-(2-methoxy-5-chlorobenzamido) - hydrindene - 5 - sulfonyl]-N'-(4,4-dihydrindene-5-sulfonamide (M.P. 217–219° C.) were dis-yield 60%.

Method II.—4.5 g. 2-(2-methoxy-5-chlorobenzamido)-hydrindene-5-sulfonamide (M.P. 217–219° C.) were dissolved in 11 ml. dimethyl formamide and mixed with 0.6 g. sodium hydride in a 50% oil suspension. After 10 minutes, 2.3 g. pyrocarbonic acid ester were added to the resulting mixture. After a further 10 minutes, 0.45 g. hydrochloric acid, dissolved in 5 ml. ethanol, were added and, finally, 1.85 g. N-amino-4,4-dimethyl-piperidine in 60 ml. toluene. To complete the reaction, the reaction mixture was heated, with stirring, for 4 hours at 100° C. After cooling, the reaction mixutre was extracted with 0.2 N sodium hydroxide solution and the aqueous layer acidified with dilute hydrochloric acid. The precipitated material was dissolved in sodium carbonate solution, treated with animal charcoal, filtered and precipitated with acetic acid. The product was finally recrystallized from a mixture of dimethyl formamide/alcohol/water. There was thusly obtained 4[2-(2-methoxy-5-chlorobenzamido)-hydrindene-5-sulfonyl] - 1,1 - (3,3-dimethyl-pentamethylene)-semicarbazide having a melting point of 195–197° C.

In an analogous manner, there was obtained 4-[2-(2-methoxy - 5 - bromobenzamido)-hydrindene-5-sulfonyl]-1,1-(3-methyl-pentamethylene)-semicarbazide; M.P. 180–183° C.

The blood sugar reducing activities of some of the new sulfonyl urea and sulfonyl semicarbazide were compared with that of the known compounds as hereinafter set out. The blood sugar reducing activity was measured in the rabbit following i.v. administration of the test compounds. The data is reported in terms of the smallest dose of test compound which produced a significant difference i.e., 15% reduction in blood sugar level. In carrying out the tests the animals were maintained in the fasting state for at least 16 hours prior to injection of the test compound. For each dosage reported at least four animals were used.

The blood sugar determinations were carried out on blood samples obtained every hour following administration of test compound. In addition, a control was employed in which the test animals were treated in the identical manner but to whom saline was administered as test compound. As reported in the table, the values given are relative values and are referred to as N-sulfanilyl-N'-(n-butyl)-urea (Nadisan; Invenol; Carbutamide). The threshold dose of the N-sulfaniyl-N'-(n-butyl)-urea in the above experiments amount to 200 mg./kg.

The compounds which were employed in the experimental procedures including the known comparison compounds are the following:

(A) N-[2-(m-chloro-benzamido)-hydrindene-5-sulfonyl]-N'-cyclohexyl-urea
(B) N-[2-(2,5-dimethoxy-benzamido)-hydrindene-5-sulfonyl]-N'-cyclohexyl-urea
(C) N-[2-(2-methoxy-5-bromo-benzamido)-hydrindene-5-sulfonyl]-N'-butylurea
(D) N[2-(2-methoxy-5-methyl-benzamido)-hydrindene-5-sulfonyl]-N'-(4-methyl-cyclohexyl)-urea
(E) N-[2-(2-methoxy-5-chloro-benzamido)-hydrindene-5-sulfonyl]-N'-cyclohexyl-urea
(F) 4-[2-(2-methoxy-5-chloro-benzamido)-hydrindene-5-sulfonyl]-1,1-(3,3-dimethyl-pentamethylene)-semicarbazide
(G) 4-[2-(2-methoxy-5-bromo-benzamido)-hydrindene-5-sulfonyl]-1,1-(3-methylpentamethylene)-semicarbazide
(H) N-[2-(N-phenyl-N-methylureido)-hydrindene-5-sulfonyl]-N'-(4-methyl-cyclohexyl)-urea
(I) N-[2-(phenylthioacetamino)-hydrindene-5-sulfonyl]-N'-cyclohexyl-urea
(J) N-[: ; 44₁[ -f fonyl]-N'-(4-methyl-cyclohexyl)-urea
(K) N-[2-hexahydrobenzamido)-hydrindene-5-sulfonyl]-N'-(4-methyl-cyclohexyl)-urea
(L) N-[2-(2-methoxy-5-bromo-benzamido)-hydrindene-5-sulfonyl]-N'-(4,4-dimethyl-cyclohexyl)-urea
(M) N-[2-(2-methoxy-5-chloro-benzabido)-hydrindene-5-sulfonyl]-N'-(4-methyl-cyclohexyl)-urea
(N) N-[2-(2-methoxy-5-chloro-benzamido-hydrindene-5-sulfonyl]-N'-)4,4-dimethyl-cyclohexyl)-urea
(O) N-(hydrindene-5-sulfonyl)-N'-butyl-urea (DAS 1,159,937)
(P) N-(hydrindene-5-sulfonyl)-N'-cyclohexyl-urea (DAS 1,159,937)
(Q) 4-(hydrindene-5-sulfonyl)-1,1-hexamethylene-semicarbazide (U.S. Pat. 3,102,115)
(R) N-sulfanilyl-N'-(n-butyl)-urea The results of the experiments are set out in the table which follows:

TABLE

| Compounds: | Threshold dose, i.v. | Relative blood sugar activity compared to R=1 |
|---|---|---|
| A | 0.25 | 800 |
| B | 0.25 | 800 |
| C | 0.5 | 400 |
| D | 0.05 | 4,000 |
| E | 0.1 | 2,000 |
| F | 0.1 | 2,000 |
| G | 0.5 | 400 |
| H | 0.5 | 400 |
| I | 0.05 | 4,000 |
| J | 0.1 | 2,000 |
| K | 0.5 | 400 |
| L | 0.25 | 800 |
| M | 0.1 | 2,000 |
| N | 0.05 | 4,000 |
| O | 50 | 4 |
| P | 20 | 10 |
| Q | 5 | 40 |
| R | 200 | 1 |

As can be seen from the table, the compounds in accordance with the invention have an increased activity over the known compounds as regards blood sugar reducing effect. The increase in activity of the compounds of the invention, as compared to the known compounds, amounts to, at the very least, a ten-fold increase in blood sugar reducing effect.

The products of this process may be combined with a pharmaceutical carrier for administration to humans in an amount to attain the desired blood sugar reducing effect. Such carriers are either solid or liquid. Exemplary of solid pharmaceutical carriers are lactose, cornstarch, manitol, talc, etc. The compounds of this invention are mixed with a carrier and filled into hard gelatin capsules or tabletted with suitable tabletting aids, such as magnesium stearate, starch, or other lubricants, distintegrants or coloring agents. If combination with a liquid carrier is desirable, a soft gelatin capsule is filled with a slurry or other dispersion of the novel compounds in soyabean, corn or peanut oil. Aqueous suspensions or solutions are prepared for alternate, oral or parenteral administration.

The dosage of the novel compounds of the present invention for the treatment of diabetes depends in the main on the age, weight, and condition of the patient being treated. The preferable form of administration is via the oral route in connection with which dosage units containing 5–50 mg. of active compound in combination with a suitable pharmaceutical diluent is employed. One or two unit dosages are good from one to four times a day.

In normal clinical use, the compounds can be employed in both the free and the salt form, and it is to be understood that the claims hereof cover the salts as well as the fundamental compounds. The activity of the compounds is independent of whether they are in salt form or otherwise. Salts may be prepared by any of the well-known standard methods. While the salt normally employed is the alkali salt and preferably the sodium salt, the compounds have been prepared in the form of other salts, such as potassium, ammonium, etc.

The blood sugar lowering compounds of this group of sulfonamide compounds according to the present invention, are capable of forming alkali metal, alkaline earth metal, and ammonium salts, and especially potassium, sodium, and magnesium metal salts, as well as salts with various organic amines which are compatible to the human system, i.e., physiologically compatible. Such salts are prepared in the usual manner, for instance, by adding a metal hydroxide to the sulfonamide compounds, the latter being relatively strong acids. It is also possible to produce salts with organic bases which are compatible to the human system in the amounts administered.

The salts set forth herein are useful in the treatment of diabetes in like manner as the compounds set forth herein, administered in the same dosage and in the time sequence as said compounds.

We claim:
1. A compound having the formula

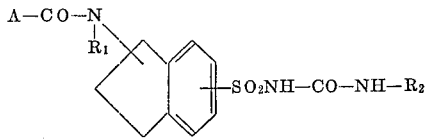

wherein A is a member selected from the group consisting of phenyl, phenyl containing up to two substituents selected from the group consisting of halogen, lower alkyl and lower alkoxy; phenyl-lower alkyl, phenylthio- lower alkyl, and cyclohexyl, $R_1$ is hydrogen and $R_2$ is a member selected from the group consisting of lower alkyl, cyclohexyl, cyclohexenyl, lower alkyl-cyclohexyl, lower alkoxy-cyclohexyl, piperidino and lower alkyl-piperidino; and salts thereof with a physiologically compatible member of the group consisting of alkali metals, alkaline earth metals, ammonia and organic amines.

2. A compound according to claim 1 designated N-[2-(2-methoxy - 5 - methyl-benzamido)-hydrindene-5-sulfonyl]-N'-(4-methyl-cyclohexyl)-urea.

3. A compound according to claim 1 designated N-[2-(2-methoxy - 5- chloro-benzamido)-hydrindene-5-sulfonyl]-N'-cyclohexyl-urea.

4. A compound according to claim 1 designated 4-[2-(2-methoxy - 5 - chloro-benzamido)-hydrindene-5-sulfonyl] - 1,1 - (3,3-dimethyl-pentamethylene)-semicarbazide.

5. A compound according to claim 1 designated N-[2-(phenylthioacetamido)-hydrindene - 5 - sulfonyl]-N'-cyclohexyl-urea.

6. A compound according to claim 1 designated N-[2-(phenylpropionyl-amino)-hydrindene-5-sulfonyl] - N'-(4-methyl-cyclohexyl)-urea.

7. A compound according to claim 1 designated N-[2-(2-methoxy - 5 - chloro-benzamido)-hydrindene-5-sulfonyl]-N'-(4-methyl-cyclohexyl)-urea.

8. A compound according to claim 1 designated N-[2-(2-methoxy - 5 - chloro-benzamido)-hydrindene-5-sulfonyl]-N'-(4,4-dimethyl-cyclohexyl)-urea.

References Cited
UNITED STATES PATENTS
3,097,242   7/1963   Hoehn et al. _____ 260—553

LEON ZITVER, Primary Examiner

G. A. SCHWARTZ, Assistant Examiner

U.S. Cl. X.R.

260—553, 332.2, 347.2, 453, 543, 552, 556, 564, 999